Sept. 8, 1953　　　　F. O. WISMAN ET AL　　　　2,651,735
BRUSH HOLDER FOR ELECTRICAL MACHINERY
Filed March 31, 1950　　　　　　　　　　　　3 Sheets-Sheet 1

INVENTOR.
FRANKLIN O. WISMAN
BY ROYAL J. REEK

Cecil J Arens

ATTORNEY

Sept. 8, 1953    F. O. WISMAN ET AL    2,651,735
BRUSH HOLDER FOR ELECTRICAL MACHINERY
Filed March 31, 1950    3 Sheets-Sheet 2

INVENTOR.
FRANKLIN O. WISMAN
ROYAL J. REEK
BY
Cecil J. Arens
ATTORNEY

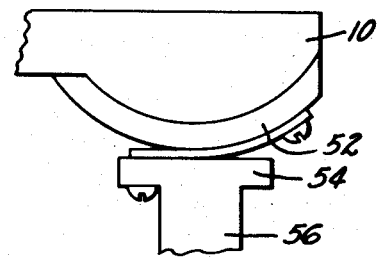
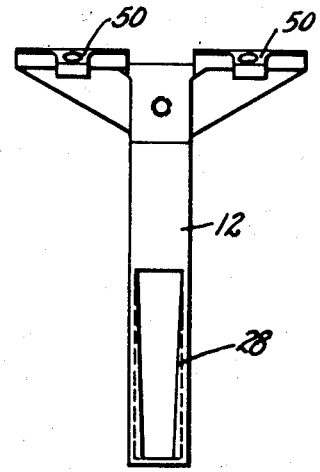
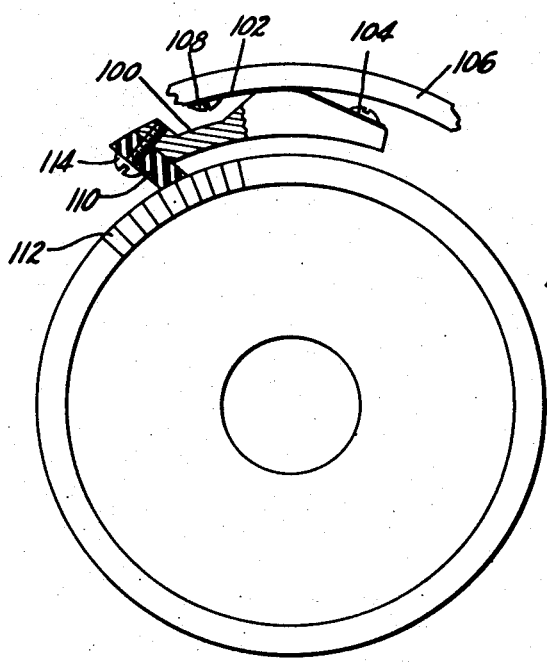
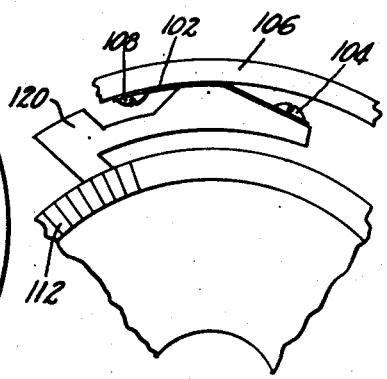

Patented Sept. 8, 1953

2,651,735

UNITED STATES PATENT OFFICE 2,651,735

BRUSH HOLDER FOR ELECTRICAL MACHINERY

Franklin O. Wisman and Royal J. Reek, South Bend, Ind., assignors to Bendix Aviation Corporation, South Bend, Ind., a corporation of Delaware Application March 31, 1950, Serial No. 153,078

13 Claims. (Cl. 310—231)

1

This invention relates to electrical machinery and particularly to brush devices therefor.

In general where brush holders are used in connection with electrical machinery, the holders are suitably secured to the nonrotatable structure. However, in some instances, automotive transmissions, for example, where it is desirable to rotate both members, one of which embraces the main field poles, the brush holders too must be rotated. In the latter example the brush holders are carried by the rotating field members and accordingly rotate therewith. Like any rotating body, the brush holder will be acted upon by centrifugal forces tending, in general, to induce rotation of the brush holder around its support as a fulcrum. For a given mass, which in the instant case includes the brush holder and brush, the moments tending to induce rotation about its support can be balanced, by positioning the mass so that the center of all centrifugal forces acting on the mass lies in a plane perpendicular to the axis and passing through the support. This balance will be maintained for a given set of conditions but should the conditions be changed, such for example, as by brush wear the balance will be upset. It is a purpose of this invention to employ novel means for automatically maintaining the mass, consisting of brush holder and brush, in a balanced state notwithstanding brush wear, by shifting the support. That is, the mass is at all times maintained in a condition of unstable equilibrium. This action has a very definite effect on the prolongation of brush life, since the frictional force of the brush on the commutator is held constant regardless of brush wear condition. Hence, brush wear is uniform. The term "area of support" as used in the specification shall be defined as that portion on the surface of the brush holder through which the combined centrifugal forces acting on the brush holder and brush are transmitted to the supporting structure.

A very important object of the invention is to provide means for prolonging brush life by maintaining the brush and holder in a state of unstable equilibrium notwithstanding brush wear.

An object of the invention is to provide a rotating brush holder for electrical machinery in which the centrifugal forces exert no influence on the brush contact force.

Another important object of the invention resides in the provision of a rotating brush holder for electrical machinery wherein the support for the holder permits repositioning thereof as the brush wears to maintain the centrifugal forces

2 on the brush and holder in a state of equilibrium about the support area.

A still further object of the invention resides in the provision of novel means for urging the brush against the commutator surface.

A yet further object of the invention resides in the provision of means for maintaining the area of support of a rotating brush holder and brush combination in a plane perpendicular to the axis of rotation and passing through the center of centrifugal forces acting on the combination.

An important object of the invention resides in the provision of a brush holder capable of having different positions of support along the supporting structure to thereby maintain the brush holder in a state of equilibrium regardless of brush wear.

The above and other objects and features of the invention will be apparent from the following description of the apparatus taken in connection with the accompanying drawings which form a part of this specification and in which:

Figure 3a is a diagrammatic showing of a modified form of the invention;

Figure 4 is a front view of the brush holder;

Figure 5 is a modified form of the device of the invention; and

Figure 5a is a further modification of the device of Figure 5.

Figure 1:
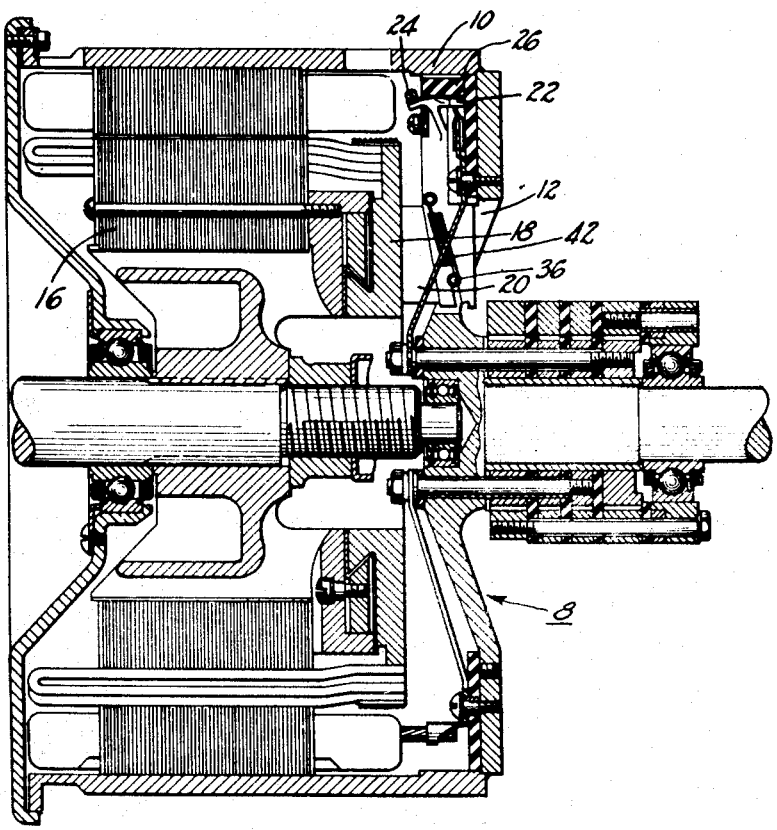
Figure 1 is a view in longitudinal section of an electrical machine incorporating the device of the invention.

Referring now to Figure 1 of the drawings the reference numeral 10 designates one of the rotating members or parts of an electrical machine 8 to which a brush holder 12 is securely fastened by screw 14. The other member of the machine is represented by the number 16 and is provided with a face type commutator or current transferring elements 18 on which a brush 20 rides. A flat spring 22 has one end secured to the rotating structure 10 by the screw 14 and the other end drilled to receive screws 24 which threadedly engage the brush holder 12. An insulating block 26 is interposed between the leaf spring 22 and the structure 10 and is held thereagainst by any suitable means, such as by screws, not shown.

The screws 14 threadedly engage the insulating block 26. See Figures 2 and 3.

Figure 4A:
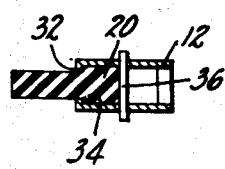
Figure 4a is a section taken on the line 4a—4a of Figure 2.

The brush holder, which is supported on the rotating structure is attached to one end of the leaf spring 22 by screws 24. As best shown in Figure 4 the free end of the brush holder is formed with a rectangular aperture 28 for receiving the carbon brush 20. The aperture is equipped with a shoulder 32 against which a shoulder 34 of the brush abuts. For urging the brush against the shoulder 32 of the brush holder, a spring loaded pin 36 extends transversely of the aperture 28, so as to engage the end of the brush opposite the end which contacts the commutator. See Figures 2 and 3. The pin 36 slides in slots 38 oppositely disposed in the side walls of the aperture. The slots are angularly related to the end of the brush in order to cam the same against the shoulder 32 of the brush holder. Notches 40 are located adjacent the open ends of slots 38 for retaining the pin 36 in position when changing a brush. Coil springs 42 are secured at one end to the brush holder with the other ends fastened to opposite ends of the pin 36 for drawing the same into the slots against the brush. This arrangement facilitates replacement of brushes and eliminates the danger of dropping parts into the machinery which is frequently the case where screws, bolts, or other parts must be removed before renewing a brush.

Figures 2, 3:
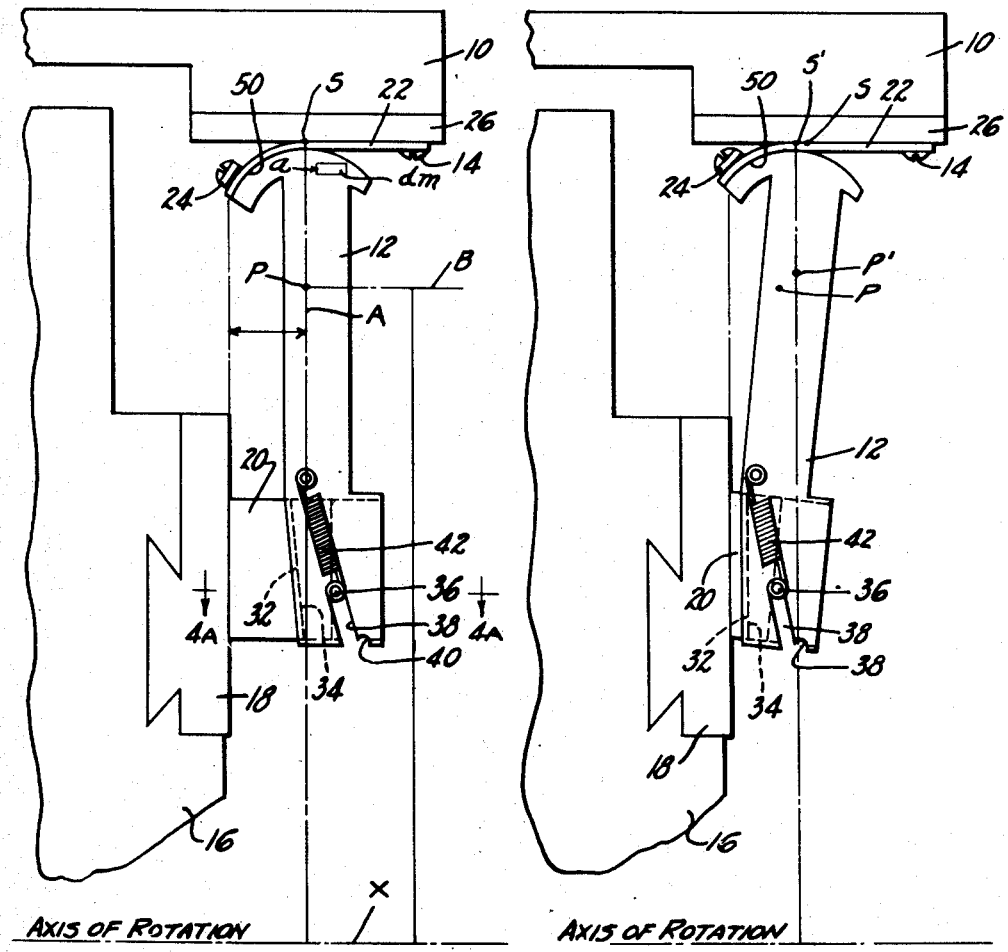
Figure 2 is a diagrammatic representation of the device of the invention illustrating the brush holder position prior to brush wear.
Figure 3 is a diagrammatic representation of the device of the invention illustrating the brush holder position after the brush has been worn.

The brush holder is so attached to the leaf spring, that the brush holder tends to be rolled in a clockwise direction around its end of support, as viewed in Figures 2 and 3. The rolling action of the brush holder and brush is in a plane which contains the axis of rotation of the rotating member 10. As can be observed in Figures 2 and 3, rolling the brush holder under the influence of the leaf spring 22 moves the brush 20 against the commutator 18 for a purpose well known to those skilled in the art.

As hereinbefore pointed out the brush holder is pivotally supported on the rotating structure of the electrical machine, which means that centrifugal forces will act on the brush holder tending, in general, to produce a moment on the same around its end of support. However, it is one of the novel features of this invention to provide means for maintaining zero moment under all conditions by causing the support for the mass to shift as the brush wears. In order for the brush and brush holder combination (hereinafter called mass) to not acquire a moment due to centrifugal forces, the support for the mass must lie in the same plane as the focal point of all the centrifugal forces acting on the mass. This plane is perpendicular to the axis of rotation and passes through the focal point P and the area of support S. See Figures 2 and 3. We then have a condition of unstable equilibrium. We must first establish a point in the mass which represents the focal point of all centrifugal forces active on the brush holder and brush combination, when the brush is new. Thus with the face of the commutator as a reference or datum line we compute the distance to a line A, Figure 2, somewhere along which all of the centrifugal forces acting on the mass can be considered concentrated.

To establish this line A we divided the summation of moments of the increments $dm$ of the mass having a radius $a$, and considered as rotating about the commutator face as a reference, by the summation of the centrifugal forces acting on these increments. The quotient of this division is the distance of the line A from the reference. Then with the axis of rotation X of the rotating member as a reference, we established another line B parallel to the axis X, by dividing the force summation by the mass summation. The intersection of these lines A and B provides the location of the focal point P of all the centrifugal forces acting on the brush holder and brush combination, when the brush is new and unworn. (In making these computations for the moments it will be noted that the centrifugal forces acting on the increments were used instead of their weights.) The support S, of the mass, and the focal point P lie in a plane perpendicular to the axis of rotation. Under these circumstances the centrifugal forces produce no net moments and the mass is in unstable equilibrium. Obviously there will be a new P and another area of support S for each worn position of the brush. Figure 3 exemplifies the location of the point P' and the area of support S' when the brush reaches its maximum worn condition. There are, of course, an infinite number of areas of support S intermediate the unworn and maximum worn conditions of the brush. The calculations necessary for arriving at point P and area of support S for conditions other than the unworn conditions are the same and will, therefore, not require further explanation.

In order to achieve a rolling action of the brush holder 12, under the influence of the leaf spring 22, the areas of support S are laid off at predetermined locations along a profiled surface 50. With this arrangement the support S, of the brush holder and brush, is intersected by a line coextensive with the axis of gyration of the mass, notwithstanding brush wear. This profiled surface along which the areas of support S are laid off, might for convenience be termed a cam although its action is not entirely like that of a cam. Instead of having the cam surface 50 at the end of the brush holder, it might just as well be formed in the structure 10, as indicated by numeral 52 in Figure 3a, wherein end 54, of brush holder 56, is flat.

Figure 5 illustrates diagrammatically one form of rotating brush holder for use with electrical machinery employing a drum type commutator. The brush holder 100 is secured to one end of leaf spring 102 by a screw 104. The other end of the leaf spring is fixed to the rotating structure 106 by a screw 108. A brush 110, rides on a commutator 112, and is carried at one end of the brush holder by a screw 114. The methods of arriving at the points P and areas of supports S are the same as for the device of Figure 1, after suitable reference axes have been selected.

Figure 5a exemplifies a further modification, in which the brush and holder are integral. This brush device 120 is shown mounted on a drum type commutator machine in the same manner as the holder of Figure 5. This integral arrangement is, of course, adaptable to face type commutators or slip rings, not shown.

Although this invention has been described in connection with certain specific embodiments, the principles are susceptible of numerous other applications that will readily occur to persons skilled in the art.

Having thus described the various features of the invention, what we claim as new and desire to secure by Letters Patent is:

We claim:

1. In combination, a brush holder for use with rotating electrical machinery and having a brush carrying portion, means providing a plurality of supporting areas for the holder on the rotating structure of the machine, each of said areas providing a new fulcrum for the holder, and means including a leaf spring lying adjacent the supporting areas and interposed between the holder and the structure of the machine for repositioning the brush holder on a new area of support as the brush wears.

2. In combination, a brush holder for use with rotating electrical machinery and having a brush carrying portion, a cam surface on the holder constituting a plurality of supporting areas along which the holder rides in moving from one supporting area to another, and means for rotating the holder around the cam surface as a fulcrum as the brush wears.

3. In combination, a brush holder for use with rotating electrical machinery and having a brush carrying portion, a cam element on which the holder pivots and spring means for pivoting the holder, said last named means comprising a leaf spring lying adjacent the cam surface and supporting said holder at one end, the other end of said spring being fastenable to said rotating machinery.

4. In combination, a brush holder for use with rotating electrical machinery and having a brush carrying portion, a plurality of supporting areas located in a preformed surface to provide pivots for the holder, a flat spring element carried by said rotating machinery and on which said holder is supported for pivotal action.

5. In combination, a brush device for electrical machinery and having a first portion positioned adjacent the current transferring elements of the machine, a second portion provided with a profiled surface along which a plurality of supporting areas are located, and means including a leaf spring interposed between said surface and the machine for rolling the device on said surface.

6. In combination, a brush device for electrical machinery of the commutator variety comprising a first portion arranged adjacent said commutator, a second portion having a series of supporting areas arranged adjacent the machine structure to thereby provide a new fulcrum point for the device for each condition of brush wear, and spring means on which said brush device is supported for carrying the second portion adjacent said structure, said spring means also capable of rotating said first portion toward said commutator.

7. In combination, a brush holder for use with rotating electrical machinery and having a brush carrying portion, means providing a plurality of pivotal areas for the holder on the rotating structure of the machine, and means including a spring on which said holder is mounted, said spring performing the dual function of carrying the holder and of repositioning the same on new pivotal areas as the brush wears.

8. In combination, a brush holder mountable on the rotating structure of an electrical machine and having an end for carrying a brush, an end opposite said first mentioned end formed with a series of supporting areas, and a flat spring having one end fixed to the rotating structure of the machine and the other end formed to lie adjacent the supporting areas to which the spring is secured, said spring being constructed and arranged to rotate said holder to new supporting areas as the brush wears.

9. In combination, a brush holder mountable on the rotatable structure of electrical machinery, means for supporting said brush holder at different positions on the rotating structure of the machine, said means including a cam surface, and a spring supported adjacent the surface, said spring mounting the brush holder at one end and securable to the rotatable structure at the other end.

10. In combination, a brush holder mounted on the rotatable structure of electrical machinery, means for supporting said brush holder on a prescribed area of said rotating structure and for shifting the holder to other areas of support as the brush wears, said means including a cam surface, and a spring constructed and arranged to lie along said cam surface, said spring supporting the brush holder at one end and secured to the rotatable structure at the other end.

11. In combination, a brush holder mountable on the rotatable structure of an electrical machine and having an end for carrying a brush, an end opposite said first mentioned end and formed with a series of supporting areas, and means including a leaf spring attached to said end provided with the supporting areas for carrying said holder so that the supporting areas lie along the rotating structure of the machine, said leaf spring capable of positioning said holder on new supporting areas as the brush wears.

12. In combination, a brush holder mountable on the rotatable structure of an electrical machine, said brush holder having one end equipped with brush-supporting structure, and a resilient member having one end fixed to the rotatable structure and a free end lying therealong, said brush holder having its other end carried on the free end of said member and formed to roll along said member which acts as a track, the arrangement of said brush holder on the free end of said member being such that when the holder is assembled on the machine the free end of said member is flexed away from said rotatable structure.

13. A brush holder to be carried by the rotatable structure of electrical machinery comprising a portion supported adjacent said structure and formed to provide a plurality of supporting areas for the holder, and a spring element secured to said holder and attachable to the structure for repositioning said holder on other areas of support as the brush wears.

FRANKLIN O. WISMAN.
ROYAL J. REEK.

References Cited in the file of this patent

UNITED STATES PATENTS

| Number | Name | Date |
|---|---|---|
| 445,448 | Holmes | Jan. 27, 1891 |
| 447,469 | Main | Mar. 3, 1891 |
| 489,185 | Goodrich | Jan. 3, 1893 |
| 516,843 | Spaulding | Mar. 20, 1894 |
| 752,839 | Henry | Feb. 23, 1904 |
| 1,270,421 | Kingsbury | June 25, 1918 |
| 1,709,381 | Urbinati | Apr. 16, 1929 |
| 2,428,162 | Hoover | Sept. 30, 1947 |

FOREIGN PATENTS

| Number | Country | Date |
|---|---|---|
| 515,809 | France | Nov. 29, 1920 |